C. GLENON.
WATER CLOSET.
APPLICATION FILED APR. 17, 1913.
1,070,245.
Patented Aug. 12, 1913.
2 SHEETS—SHEET 1.
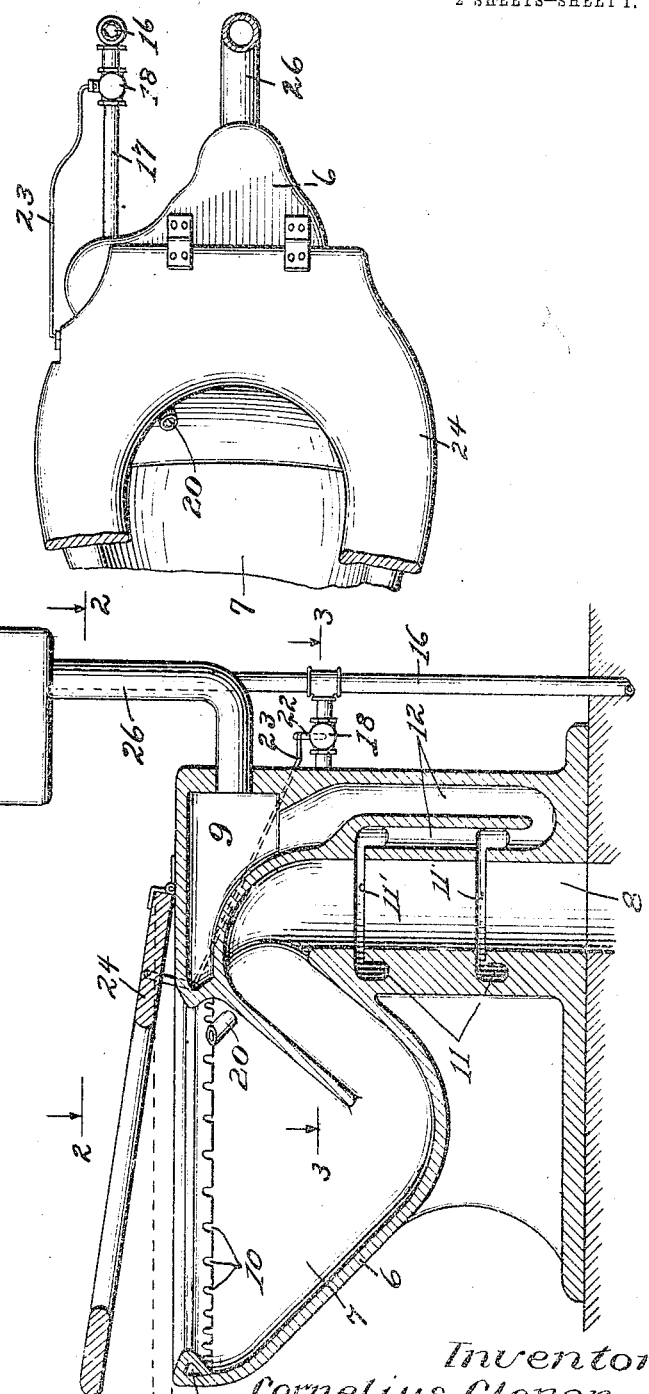
Witnesses:
Henry S. Bull
T. Colson.
Inventor:
Cornelius Glenon
By Joshua R. H. Potts
His Attorney

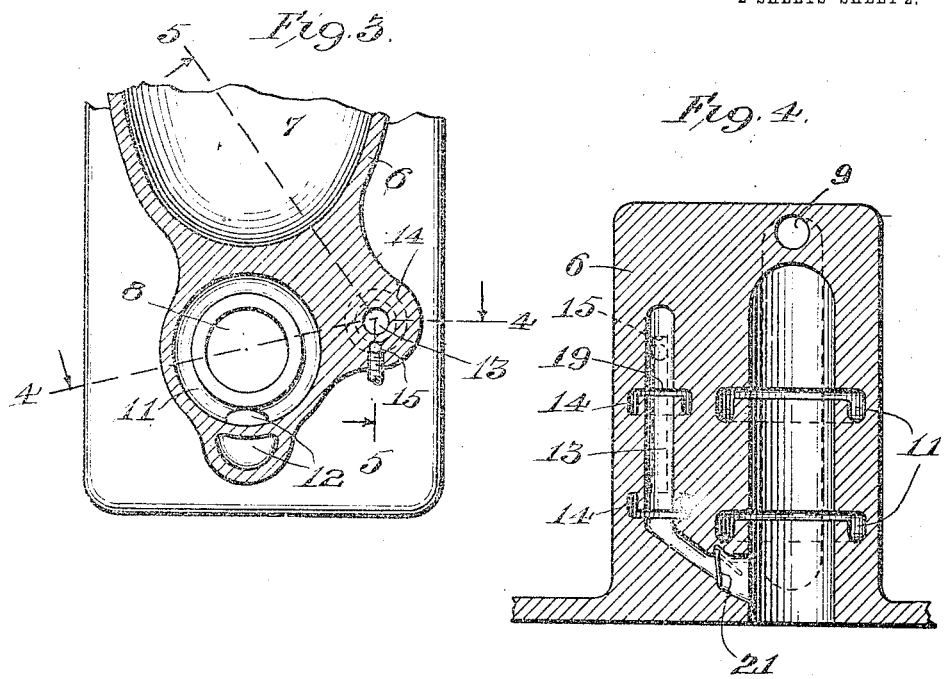

UNITED STATES PATENT OFFICE.

CORNELIUS GLENON, OF ELKHART, INDIANA.

WATER-CLOSET.

1,070,245.

Specification of Letters Patent.

Patented Aug. 12, 1913.

Application filed April 17, 1913. Serial No. 761,659.

*To all whom it may concern:*

Be it known that I, CORNELIUS GLENON, a citizen of the United States, and a resident of the city of Elkhart, county of Elkhart, and State of Indiana, have invented certain new and useful Improvements in Water-Closets, of which the following is a specification.

My invention relates to water closets and more particularly to means for ventilating the same.

The object of this improvement is to provide a simple and effective means for passing currents of water through the waste of a water closet to afford ventilation therefor.

Other objects will appear hereinafter.

The invention consists in the combinations and arrangements of parts hereinafter described and claimed.

The invention will be best understood by reference to the accompanying drawings forming a part of this specification, and in which—

Figure 1 is a sectional view of a closet embodying my invention, Fig. 2 is a section taken on line 2—2 of Fig. 1, Fig. 3 is a section taken on line 3—3 of Fig. 1, Fig. 4 is a section taken on line 4—4 of Fig. 3, and Fig. 5 is a section taken on line 5—5 of Fig. 3.

The preferred form of construction as illustrated in the drawings comprises a closet bowl 6 of conventional construction having a hopper 7, a waste passage 8 and a flushing passage 9. The flushing passage 9 extends around the top edge of hopper 7 and is provided with openings 10 through which the water enters hopper 7 to flush the closet. This part of the construction is of conventional or any preferred design. Around the waste passage 8 are circular passages 11 joined together by a passage 12. The passage 12 continues downwardly below the lower circular passage 11 and thence upwardly and connecting with the flushing passage 9 in order to form a trap. The circular passages 11 are each provided with an annular orifice 11' adapted to deliver a thin sheet of water from the circular passages 11 to the waste passage 8. In the rear portion of the bowl 6 near the waste passage 8 is a second passage 13 provided with annular passages 14 and said annular passages 14 are connected together by means of a passage 15 which in turn is connected to the supply pipe 16 by means of a pipe 17, said pipe 17 being provided with a valve 18 to limit the passage of water therethrough. The annular passages 14 are each provided with a slitted orifice 19 adapted to permit a thin sheet of water to enter the passage 13. The upper portion of passage 13 is provided with an extension 20 which reaches into the hopper 7 near the upper side thereof. The function of extension 20 and passage 13 is to remove odors by means of the suction of the sheets of water entering at the passage 13 through the orifices 19. The lower end of passage 13 communicates with the waste passage 8 and is provided with a trap door 21 which is disposed so that it normally rests closed by gravity.

The valve 18 is of usual construction and provided with an actuating lever 22 which is connected by means of a connecting rod 23 with the seat 24. The seat 24 is provided with a spring hinge which normally maintains it in the position indicated by the full lines in Fig. 1. When in use the seat 24 is depressed to its full line position in Fig. 1 which movement opens valve 18 by means of the connecting mechanism.

In operation, the seat 24 is depressed from its full line to the dotted line position in Fig. 1 which opens the valve 18 permitting water from the supply pipe 16 to enter pipe 17, passages 15 and 14 and through the annular orifices 19 into passage 13. The movement of water through the orifices 19 causes a vacuum and draws air through tube 20 and passage 13 which with the water entering said passage passes downwardly through the valve 21 into waste passage 8. The water continues to pass through passage 13 as long as the seat 24 is depressed and as soon as it is released the valve 18 is automatically closed cutting off the supply of water therefrom. When the closet is flushed in the usual manner water passes from tank 25 through waste pipe 26 into passage 9 and thence through the openings 10 into hopper 7, and outwardly through the waste passage 8. A portion of the water entering passage 9 passes downwardly through the trap passage 12 into circular passages 11 and thence through the annular orifices 11' into passage 8 to increase the vacuum in waste passage 8 thereby making sure that all odors have been drawn into waste 8 with the water.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A construction of the class described comprising a bowl and a discharge therefor, there being two trapped passages surrounding said discharge and communicating therewith through narrow slits; and means for supplying water to said passages, substantially as described.

2. A construction of the class described comprising a bowl and a discharge therefor, there being two spaced water passages surrounding said discharge and communicating therewith through narrow slits; a water passage surrounding the upper portion of said bowl and communicating therewith through openings; and a trapped passage for supplying water to the passage surrounding said discharge, substantially as described.

3. A construction of the class described comprising a bowl and a discharge therefor; a ventilating passage communicating with said bowl and said discharge; water passages surrounding said ventilating passages and communicating therewith through narrow slits; and automatic means for supplying water to said water passages, substantially as described.

4. A construction of the class described comprising a bowl and a discharge therefor; a ventilating passage communicating with said bowl and said discharge; two spaced water passages surrounding said ventilating passage and communicating therewith through narrow slits; automatic means for supplying water to said water passage; and a trapped door at the entrance of said ventilating passage to said discharge, substantially as described.

In testimony whereof I have signed my name to this specification in the presence of subscribing witnesses.

CORNELIUS GLENON.

Witnesses:
CLAUDE A. LEE,
ANDREW MILLER.